US008041642B2

(12) United States Patent
Lenard et al.

(10) Patent No.: US 8,041,642 B2
(45) Date of Patent: *Oct. 18, 2011

(54) PREDICTIVE SOFTWARE LICENSE BALANCING

(75) Inventors: Rohan Lenard, Crows Nest (AU); Julian J. Orbach, Ryde (AU); Martin Smyrk, Collaroy Plateau (AU)

(73) Assignee: Avaya Inc., Basking Ridge, NJ (US)

( * ) Notice: Subject to any disclaimer, the term of this patent is extended or adjusted under 35 U.S.C. 154(b) by 1476 days.

This patent is subject to a terminal disclaimer.

(21) Appl. No.: 10/192,388

(22) Filed: Jul. 10, 2002

(65) Prior Publication Data

US 2004/0010440 A1    Jan. 15, 2004

(51) Int. Cl.
*G06F 21/00* (2006.01)
(52) U.S. Cl. .......................... 705/59; 705/902
(58) Field of Classification Search ..................... 705/59
See application file for complete search history.

(56) References Cited

U.S. PATENT DOCUMENTS

| | | | |
|---|---|---|---|
| 4,288,659 A | 9/1981 | Atalla | |
| 4,405,829 A | 9/1983 | Rivest et al. | |
| 4,780,821 A | 10/1988 | Crossley | |
| 4,811,393 A | 3/1989 | Hazard | |
| 4,888,800 A | 12/1989 | Marshall et al. | |
| 4,937,863 A | 6/1990 | Robert et al. | |
| 5,005,122 A | 4/1991 | Griffin et al. | |
| 5,023,907 A * | 6/1991 | Johnson et al. ............... 710/200 | |
| 5,157,663 A | 10/1992 | Major et al. | |
| 5,179,591 A | 1/1993 | Hardy et al. | |
| 5,204,897 A | 4/1993 | Wyman | |
| 5,206,903 A | 4/1993 | Kohler et al. | |
| 5,230,020 A | 7/1993 | Hardy et al. | |
| 5,260,999 A * | 11/1993 | Wyman ........................... 705/59 |
| 5,307,481 A | 4/1994 | Shimazaki et al. | |
| 5,329,570 A | 7/1994 | Glassmacher et al. | |
| 5,341,427 A | 8/1994 | Hardy et al. | |
| 5,347,580 A | 9/1994 | Molva et al. | |
| 5,386,369 A | 1/1995 | Christiano | |
| 5,390,297 A | 2/1995 | Barber et al. | |
| 5,408,649 A | 4/1995 | Beshears et al. | |
| 5,448,639 A | 9/1995 | Arazi | |
| 5,553,143 A | 9/1996 | Ross et al. | |
| 5,563,946 A | 10/1996 | Cooper et al. | |
| 5,579,222 A | 11/1996 | Bains et al. | |

(Continued)

FOREIGN PATENT DOCUMENTS

EP     1071253     1/2001

(Continued)

OTHER PUBLICATIONS 5,742,747, filed Apr. 1, 1998, Hamadani, et al. (withdrawn).

(Continued)

*Primary Examiner* — Jamie Kucab
(74) *Attorney, Agent, or Firm* — Sheridan Ross P.C.

(57) ABSTRACT

A predictive software license balancing system for allocating a predetermined number of software licenses between two or more license servers located at different sites. Each license server compiles software license usage statistics and shares the usage statistics with the other license servers. Based in the compiled software license usage over time, the software license usage for each site is predicted and the available software licenses distributed accordingly, thus balancing the number of software licenses available at each site based on predicted software license usage.

17 Claims, 5 Drawing Sheets

U.S. PATENT DOCUMENTS

| | | | |
|---|---|---|---|
| 5,629,980 A | 5/1997 | Stefik et al. | |
| 5,646,992 A | 7/1997 | Subler et al. | |
| 5,671,412 A | 9/1997 | Christiano | |
| 5,673,315 A | 9/1997 | Wolf | |
| 5,699,431 A | 12/1997 | Van Oorschot et al. | |
| 5,708,709 A | 1/1998 | Rose | |
| 5,717,604 A | 2/1998 | Wiggins | |
| 5,724,428 A | 3/1998 | Rivest | |
| 5,742,757 A * | 4/1998 | Hamadani et al. | 726/32 |
| 5,745,569 A | 4/1998 | Moskowitz et al. | |
| 5,745,576 A | 4/1998 | Abraham et al. | |
| 5,745,879 A | 4/1998 | Wyman | |
| 5,754,761 A | 5/1998 | Willsey | |
| 5,758,068 A | 5/1998 | Brandt et al. | |
| 5,758,069 A | 5/1998 | Olsen | |
| 5,790,074 A | 8/1998 | Rangedahl et al. | |
| 5,790,664 A * | 8/1998 | Coley et al. | 709/203 |
| 5,796,941 A | 8/1998 | Lita | |
| 5,828,747 A | 10/1998 | Fisher et al. | |
| 5,835,600 A | 11/1998 | Rivest | |
| 5,864,620 A | 1/1999 | Pettitt | |
| 5,905,793 A | 5/1999 | Flockhart et al. | |
| 5,905,860 A * | 5/1999 | Olsen et al. | 726/27 |
| 5,935,243 A | 8/1999 | Hasebe et al. | |
| 5,940,504 A | 8/1999 | Griswold | |
| 5,956,505 A | 9/1999 | Manduley | |
| 5,956,716 A * | 9/1999 | Kenner et al. | 707/10 |
| 5,960,085 A | 9/1999 | de la Huerga | |
| 5,978,565 A | 11/1999 | Ohran et al. | |
| 5,982,873 A | 11/1999 | Flockhart et al. | |
| 5,995,625 A | 11/1999 | Sudia et al. | |
| 6,006,016 A | 12/1999 | Faigon et al. | |
| 6,009,401 A | 12/1999 | Horstmann | |
| 6,011,973 A | 1/2000 | Valentine et al. | |
| 6,023,763 A | 2/2000 | Grumstrup et al. | |
| 6,023,766 A | 2/2000 | Yamamura | |
| 6,047,242 A | 4/2000 | Benson | |
| 6,067,621 A | 5/2000 | Yu et al. | |
| 6,108,703 A | 8/2000 | Leighton et al. | |
| 6,128,389 A | 10/2000 | Chan et al. | |
| 6,134,660 A | 10/2000 | Boneh et al. | |
| 6,148,415 A | 11/2000 | Kobayashi et al. | |
| 6,163,607 A | 12/2000 | Bogart et al. | |
| 6,173,053 B1 | 1/2001 | Bogart et al. | |
| 6,178,511 B1 | 1/2001 | Cohen et al. | |
| 6,189,146 B1 | 2/2001 | Misra et al. | |
| 6,192,122 B1 | 2/2001 | Flockhart et al. | |
| 6,212,635 B1 | 4/2001 | Reardon | |
| 6,219,652 B1 | 4/2001 | Carter et al. | |
| 6,223,291 B1 | 4/2001 | Puhl et al. | |
| 6,246,871 B1 | 6/2001 | Ala-Laurila | |
| 6,314,565 B1 | 11/2001 | Kenner et al. | |
| 6,343,280 B2 * | 1/2002 | Clark | 705/55 |
| 6,360,320 B1 | 3/2002 | Ishiguro et al. | |
| 6,381,747 B1 | 4/2002 | Wonfor et al. | |
| 6,414,595 B1 | 7/2002 | Scrandis et al. | |
| 6,421,726 B1 | 7/2002 | Kenner et al. | |
| 6,442,708 B1 | 8/2002 | Dierauer et al. | |
| 6,463,534 B1 | 10/2002 | Geiger et al. | |
| 6,498,791 B2 | 12/2002 | Pickett et al. | |
| 6,502,079 B1 | 12/2002 | Ball et al. | |
| 6,513,117 B2 | 1/2003 | Tarpenning et al. | |
| 6,513,121 B1 | 1/2003 | Serkowski | |
| 6,539,481 B1 | 3/2003 | Takahashi et al. | |
| 6,557,105 B1 | 4/2003 | Tardo et al. | |
| 6,574,612 B1 | 6/2003 | Baratti et al. | |
| 6,584,454 B1 | 6/2003 | Hummel, Jr. et al. | |
| 6,615,347 B1 | 9/2003 | de Silva et al. | |
| 6,640,305 B2 | 10/2003 | Kocher et al. | |
| 6,654,888 B1 | 11/2003 | Cooper et al. | |
| 6,675,208 B1 | 1/2004 | Rai et al. | |
| 6,697,945 B2 | 2/2004 | Ishiguro et al. | |
| 6,760,324 B1 | 7/2004 | Scott et al. | |
| 6,765,492 B2 | 7/2004 | Harris | |
| 6,769,063 B1 | 7/2004 | Kanda et al. | |
| 6,772,133 B1 | 8/2004 | Kambayashi et al. | |
| 6,775,782 B1 | 8/2004 | Buros et al. | |
| 6,778,820 B2 | 8/2004 | Tendler | |
| 6,785,726 B1 * | 8/2004 | Freeman et al. | 709/227 |
| 6,795,941 B2 | 9/2004 | Nickels | |
| 6,816,842 B1 | 11/2004 | Singh et al. | |
| 6,826,606 B2 | 11/2004 | Freeman et al. | |
| 6,842,896 B1 | 1/2005 | Redding et al. | |
| 6,850,958 B2 | 2/2005 | Wakabayashi | |
| 6,854,010 B1 | 2/2005 | Christian et al. | |
| 6,868,403 B1 | 3/2005 | Wiser et al. | |
| 6,876,984 B2 | 4/2005 | Tadayon et al. | |
| 6,883,095 B2 | 4/2005 | Sandhu et al. | |
| 6,889,212 B1 | 5/2005 | Wang et al. | |
| 6,901,386 B1 * | 5/2005 | Dedrick et al. | 705/59 |
| 6,904,523 B2 | 6/2005 | Bialick et al. | |
| 6,920,567 B1 | 7/2005 | Doherty et al. | |
| 6,928,166 B2 | 8/2005 | Yoshizawa | |
| 6,928,558 B1 | 8/2005 | Allahwerdi et al. | |
| 6,934,463 B2 | 8/2005 | Ishiguro et al. | |
| 6,934,848 B1 | 8/2005 | King et al. | |
| 6,941,283 B2 | 9/2005 | Kambayashi et al. | |
| 6,957,344 B1 | 10/2005 | Goldshlag et al. | |
| 6,959,291 B1 | 10/2005 | Armstrong et al. | |
| 6,961,858 B2 | 11/2005 | Fransdonk | |
| 6,968,384 B1 | 11/2005 | Redding et al. | |
| 6,973,444 B1 | 12/2005 | Blinn et al. | |
| 6,976,164 B1 | 12/2005 | King et al. | |
| 6,981,222 B2 | 12/2005 | Rush et al. | |
| 6,993,664 B2 | 1/2006 | Padole et al. | |
| 7,032,113 B2 | 4/2006 | Pendlebury | |
| 7,035,918 B1 | 4/2006 | Redding et al. | |
| 7,065,214 B2 | 6/2006 | Ishiguro et al. | |
| 7,073,063 B2 | 7/2006 | Peinado | |
| 7,080,402 B2 | 7/2006 | Bates et al. | |
| 7,085,382 B2 | 8/2006 | Terao et al. | |
| 7,096,469 B1 | 8/2006 | Kubala et al. | |
| 7,100,044 B2 | 8/2006 | Watanabe et al. | |
| 7,100,200 B2 | 8/2006 | Pope et al. | |
| 7,124,304 B2 | 10/2006 | Bel et al. | |
| 7,127,442 B2 | 10/2006 | Mazza et al. | |
| 7,139,737 B2 | 11/2006 | Takahashi et al. | |
| 7,143,409 B2 | 11/2006 | Herrero | |
| 7,146,340 B1 | 12/2006 | Musson | |
| 7,149,806 B2 | 12/2006 | Perkins et al. | |
| 7,152,245 B2 | 12/2006 | Dublish et al. | |
| 7,171,662 B1 | 1/2007 | Misra et al. | |
| 7,185,195 B2 | 2/2007 | Hug et al. | |
| 7,197,321 B2 | 3/2007 | Erskine et al. | |
| 7,206,936 B2 | 4/2007 | Aull et al. | |
| 7,216,363 B2 | 5/2007 | Serkowski et al. | |
| 7,225,333 B2 | 5/2007 | Peinado et al. | |
| 7,228,426 B2 | 6/2007 | Sinha et al. | |
| 7,228,567 B2 | 6/2007 | Serkowski et al. | |
| 7,260,557 B2 | 8/2007 | Chavez | |
| 7,272,500 B1 | 9/2007 | Walker | |
| 7,278,164 B2 | 10/2007 | Raiz et al. | |
| 7,283,519 B2 | 10/2007 | Girard | |
| 7,302,703 B2 | 11/2007 | Burns | |
| 7,308,717 B2 | 12/2007 | Koved et al. | |
| 7,310,734 B2 | 12/2007 | Boate et al. | |
| 7,313,828 B2 | 12/2007 | Holopainen | |
| 7,318,236 B2 | 1/2008 | DeMello et al. | |
| 7,336,791 B2 | 2/2008 | Ishiguro | |
| 7,353,388 B1 | 4/2008 | Gilman | |
| 7,356,692 B2 | 4/2008 | Bialick et al. | |
| 7,373,657 B2 | 5/2008 | Walker | |
| 7,382,881 B2 | 6/2008 | Uusitalo et al. | |
| 7,383,205 B1 | 6/2008 | Peinado et al. | |
| 7,415,729 B2 | 8/2008 | Ukeda et al. | |
| 7,545,931 B2 | 6/2009 | Dillaway | |
| 7,549,172 B2 | 6/2009 | Tokutani et al. | |
| 7,552,166 B2 | 6/2009 | Chack | |
| 7,681,245 B2 | 3/2010 | Walker et al. | |
| 2001/0001268 A1 | 5/2001 | Menon et al. | |
| 2001/0034846 A1 | 10/2001 | Beery | |
| 2002/0013722 A1 | 1/2002 | Kanaga | |
| 2002/0017977 A1 | 2/2002 | Wall | |
| 2002/0038422 A1 | 3/2002 | Suwamoto et al. | |
| 2002/0052939 A1 | 5/2002 | Lee | |
| 2002/0083003 A1 | 6/2002 | Halliday et al. | |
| 2002/0087892 A1 | 7/2002 | Hideyo | |

| | | |
|---|---|---|
| 2002/0107809 A1 | 8/2002 | Biddle et al. |
| 2002/0112186 A1 | 8/2002 | Ford et al. |
| 2002/0116340 A1 | 8/2002 | Hellberg et al. |
| 2002/0138441 A1 | 9/2002 | Lopatic |
| 2002/0154777 A1 | 10/2002 | Candelore |
| 2002/0169625 A1 | 11/2002 | Yang et al. |
| 2002/0169725 A1 | 11/2002 | Eng |
| 2002/0188656 A1 | 12/2002 | Patton et al. |
| 2002/0188704 A1 | 12/2002 | Gold |
| 2003/0013411 A1 | 1/2003 | Uchiyama |
| 2003/0018491 A1 | 1/2003 | Nakahara et al. |
| 2003/0018582 A1 | 1/2003 | Yaacovi |
| 2003/0023564 A1 | 1/2003 | Padhye et al. |
| 2003/0055749 A1 | 3/2003 | Carmody et al. |
| 2003/0084306 A1 | 5/2003 | Abburi et al. |
| 2003/0095542 A1 | 5/2003 | Chang et al. |
| 2003/0144959 A1 | 7/2003 | Makita |
| 2003/0149670 A1 | 8/2003 | Cronce |
| 2003/0149874 A1 | 8/2003 | Balfanz et al. |
| 2003/0156719 A1 | 8/2003 | Cronce |
| 2003/0159033 A1 | 8/2003 | Ishiguro |
| 2003/0159070 A1 | 8/2003 | Mayer et al. |
| 2003/0163428 A1 | 8/2003 | Schneck et al. |
| 2003/0172035 A1* | 9/2003 | Cronce et al. ................... 705/59 |
| 2003/0177393 A1 | 9/2003 | Ishiguro |
| 2003/0191936 A1 | 10/2003 | Kawatsura et al. |
| 2003/0208449 A1 | 11/2003 | Diao |
| 2003/0233547 A1 | 12/2003 | Gaston et al. |
| 2004/0003269 A1 | 1/2004 | Waxman et al. |
| 2004/0010469 A1 | 1/2004 | Lenard et al. |
| 2004/0044629 A1 | 3/2004 | Walker et al. |
| 2004/0044630 A1 | 3/2004 | Walker et al. |
| 2004/0047354 A1 | 3/2004 | Slater et al. |
| 2004/0054930 A1 | 3/2004 | Walker et al. |
| 2004/0073517 A1 | 4/2004 | Zunke et al. |
| 2004/0078339 A1 | 4/2004 | Goringe et al. |
| 2004/0088541 A1 | 5/2004 | Messerges et al. |
| 2004/0103011 A1 | 5/2004 | Hatano et al. |
| 2004/0103324 A1 | 5/2004 | Band |
| 2004/0127196 A1 | 7/2004 | Dabbish et al. |
| 2004/0128395 A1 | 7/2004 | Miyazaki |
| 2004/0128551 A1 | 7/2004 | Walker et al. |
| 2004/0133794 A1 | 7/2004 | Kocher et al. |
| 2004/0162998 A1 | 8/2004 | Tuomi et al. |
| 2004/0181696 A1 | 9/2004 | Walker |
| 2004/0249763 A1 | 12/2004 | Vardi |
| 2004/0260589 A1 | 12/2004 | Varadarajan et al. |
| 2004/0268120 A1 | 12/2004 | Mirtal et al. |
| 2005/0005098 A1 | 1/2005 | Michaelis et al. |
| 2005/0038753 A1 | 2/2005 | Yen et al. |
| 2005/0076204 A1 | 4/2005 | Thornton et al. |
| 2005/0086174 A1* | 4/2005 | Eng ................................. 705/59 |
| 2005/0091507 A1 | 4/2005 | Lee et al. |
| 2005/0144437 A1 | 6/2005 | Ransom et al. |
| 2005/0154877 A1 | 7/2005 | Trench |
| 2005/0198510 A1 | 9/2005 | Robert et al. |
| 2005/0202830 A1 | 9/2005 | Sudit |
| 2005/0229004 A1 | 10/2005 | Callaghan |
| 2005/0246098 A1 | 11/2005 | Bergstrom et al. |
| 2005/0289072 A1 | 12/2005 | Sabharwal |
| 2006/0021068 A1 | 1/2006 | Xu et al. |
| 2006/0026105 A1 | 2/2006 | Endoh |
| 2006/0036554 A1 | 2/2006 | Schrock et al. |
| 2006/0036894 A1 | 2/2006 | Bauer et al. |
| 2006/0064582 A1 | 3/2006 | Teal et al. |
| 2006/0089912 A1 | 4/2006 | Spagna et al. |
| 2006/0178953 A1 | 8/2006 | Aggarwal et al. |
| 2006/0242083 A1 | 10/2006 | Chavez |
| 2006/0294010 A1 | 12/2006 | Kim et al. |
| 2007/0033419 A1 | 2/2007 | Kocher et al. |
| 2007/0094710 A1 | 4/2007 | Walker et al. |
| 2007/0107067 A1 | 5/2007 | Fountian |
| 2007/0219917 A1 | 9/2007 | Liu et al. |
| 2008/0052295 A1 | 2/2008 | Walker et al. |
| 2008/0082449 A1 | 4/2008 | Wilkinson et al. |
| 2008/0141242 A1 | 6/2008 | Shapiro |
| 2008/0189131 A1 | 8/2008 | Chavez |
| 2010/0049725 A1 | 2/2010 | Walker et al. |

FOREIGN PATENT DOCUMENTS

| | | |
|---|---|---|
| EP | 1562378 | 8/2005 |
| JP | 2006/085481 | 3/2006 |

OTHER PUBLICATIONS

U.S. Appl. No. 10/947,418, Gilman (Sep. 21, 2004).
U.S. Appl. No. 10/956,861, Robinson (Sep. 30, 2004).
U.S. Appl. No. 11/051,316, Mazza (Feb. 4, 2005).
U.S. Appl. No. 11/222,997, Rao (Sep. 8, 2005).
ADTech Engineering, "IP Phone SI-160 User Manual (SCCP releases)," Version 1.2 (2002), pp. 1-20.
Arsys, "Public Key Infrastructure," (Feb. 4, 2001), available at http://vvww.transactiontrust.com/technicaindex.htnnl, 4 pages.
Articsoft Limited, "Public Key Infrastructure (PKI) FAQs" (Feb. 2, 2003), available at http://www.articsoft.com/wp_pki_faq.htm, 5 pages.
Clarke, Roger, "Centrelink Smart Card Technical Issues Starter Kit Chapter 7" (Apr. 8, 1998) at http://www.anu.edu.au/people/Roger.Clarke/DV/SCTISK.html, pp. 1-3.
Datakey, "Securing a Virtual Private Network withSmart Card Technology", Aug. 1, 2002; available at www.datakey.com, pp. 1-8.
"Digital Cinema Key Management Messages," Draft 1 (Aug. 8, 2002), pp. 1-9.
Discerning the Times Digest and Newsbytes, "Global Control of All Buying and Selling Now Possible," vol. 1 Iss. 1 (Jan. 2000), available at http://www.discerningtoday.org/members/Digest/2000Digest/January/Global%20Control.htm, 2 pages.
Entrust Inc., "Entrust Authority Security Manager," (printed Aug. 13, 2004), avaiable at http://www.entrust.com/authority/manager/index.htm, 23 pages.
Giswold, Robert S., "Get Smart: The Coming Revolution of Smart Cards," Journal of Property Management (May/Jun. 1997), 5 pages.
Info Merchant Store, "VeriFone 2000, MS/DUKPT/STD Pin Pad, New" (printed Feb. 17, 2004), avaiable at http://www.merchantamerica.com/creditcardterminals/index.php?ba=product_enlarge&product=96 32, 1 page.
Infosec Engineering, "Building a Corporate Public Key Infrastructure" (1999), available at http://www.infoseceng.com/corppki.htm, 20 pages.
LockStream Corporation, "Catalyst DRM Service Platform"; available at http://www.lockstream.com/products_spcm.php, 1 page; 2003.
LockStream Corporation, "Lockstream KeyDRM"; available at http://www.lockstream.com/products_1gm.php, 2 pages.; 2003.
LockStream Corporation, "Lockstream OMA 1.0 DRM Client", available at http://www.lockstream.com/products_sprm.php, 2 pages; 2003.
LockStream Corporation, Catalyst DRM Service Platform Architecture, Vers. 1.0 (Nov. 2003), pp. 1-28.
Microsoft Corporation, "Accessing a Smart Card" (Aug. 2002), avaiable at http://msdn.microsoft.com/library/en-us/security/security/accessing_a_smart_card.asp, p. 1.
Microsoft Corporation, "Base Service Providers" (Aug. 2002), avaiable at http://msdn.microsoft.com/library/en-us/security/security/base_service_providers.asp, p. 1.
Microsoft Corporation, "Building an ISO7816-4 APDU Command" (Aug. 2002), avaiable at http://msdn.microsoft.com/library/en-us/security/security/building_an_iso7816_4_apdu_command.asp, pp. 1-2.
Microsoft Corporation, "Introducing Smart Cards to theSystem" (Aug. 2002), avaiable at http://msdn.microsoft.com/library/en-us/security/security/introducing_smart_cards_to the system. asp, p. 1.
Microsoft Corporation, "Primary Service Provider" (Aug. 2002), avaiable at http://msdn.microsoft.com/library/en-us/security/security/primary_service_provider.asp, p. 1.
Microsoft Corporation, "Smart Card Authentication" (Aug. 2002), avaiable at http://msdn.microsoft.com/library/en-us/security/security/smart_card_authentication.asp, pp. 1-2.
Microsoft Corporation, "Smart Card Interfaces" (Aug. 2002), avaiable at http://msdn.microsoft.com/library/en-us/security/security/smart_card_interfaces.asp, pp. 1-2.

Microsoft Corporation, "Smart Card Resource Manager" (Aug. 2002), avaiable at http://msdn.microsoft.com/library/en-us/security/security/smart_card_resource_manager.asp, pp. 1.
Microsoft Corporation, "Smart Card Service Providers" (Aug. 2002), avaiable at http://msdn.microsoft.com/library/en-us/security/security/smart_card_service_providers.asp, pp. 1.
Microsoft Corporation, "Smart Card User Interface" (Aug. 2002), avaiable at http://msdn.microsoft.com/library/en-us/security/security/smart_card_user_interface.asp, pp. 1.
Microsoft Corporation, "Vendor Wrapper Service Providers" (Aug. 2002), avaiable at http://msdn.microsoft.com/library/en-us/security/security/vendor_wrapper_service_providers.asp, pp. 1.
MIT Laboratory for Computer Science, "The Cricket Indoor Location System," An NMS Project (printed Jul. 31, 2002), available at http://nms.lcs.mit.edu/projects/cricket/, 5 pages.
Motorola Press Release, "ERG Motorola Alliance Receives Award for Smart Card" (Jun. 6, 2000), available at http://motorola.com/LMPS/pressreleases/page88.htm, 3 pages.
NEC Infrontia Corporation Press Release, "Establishment of "SmartCardlnfrontia" solutions for 'IC card'," (Mar. 13, 2002), 4 pages.
NetLingo Dictionary of Internet Words, "Smart Card" (1995-2004), available at http://www.netlingo.com/lookup.cfm?term=smart+card, 2 pages.
Novell®, "Certificate Server: Public Key Infrastructure," White Paper (1999), pp. 1-10.
Rankl, Wolfgang, "Smart Card Handbook,", available at http://www.wrankl.de/SCH/SCH.html, 8 pages; 1998-2004.
Russinovich, Mark, "Inside Encrypting Fily System, Part 1, "Windows & .NET Magazine (Jun. 1999), available at http://www.winntmag.com/Articles/Index.cfm?ArticleID=5387&Key=Internals, 4 pages.
Russinovich, Mark, "Inside Encrypting Fily System, Part 2, "Windows & .NET Magazine (Jul. 1999), available at http://www.winntmag.com/Articles/Index.cfm?ArticleID=5592&Key=Internals, 5 pages.
Security Config, Back Up Your Encrypting File System Private Key in Windows 2000 Download; avaiable at http://www.securityconfig.com/software/alerts/back_up_your_encrypting_file_system_private_key_in_windows_2000.html, 2 pages; 2003.
Smart Card Alliance Industry News, "Cubic Corp. Intoduces New National Security and Homeland Defense" (Sep. 9, 2002), avaiable at http://www.smartcardalliance.org/industry_news/industry_news_item.cfm?itenilD=310, 2 pages.
Smart Card Alliance Industry News, "Cubic Introduces New Mobile Ticketing Machine" (Jul. 3, 2003), avaiable at http://www.smartcardalliance.org/industry_news/industry_news_item.cfm?itemID=852, 2 pages.
SSH Communications Security Corp., "Enabling Virtual Public Networks with Public Key Infrastructure," White Paper (Jan. 2004), pp. 1-9.
Streetman, Kibbee K. et al., "Public Key Infrastructure: Resources, Requirements and Recommendations," ATI IPT Special Report 00-06 (Apri. 20000), pp. 145.
Sun Developer Network, "Smart Card Overview," Sun Microsystems, Inc. (1994-2004), avaiable at http://java.sun.com/products/javacard/smartcards.html, 2 pages.
VeriFone Inc., "VeriFone Payment Solutions: Point-of-Sale PINpads" (1997-2004), available at http://www.verifone.com/products/printers_peripherals/html/pinpad_family.html, 1 page.
Whatis.com Target SearchTM, "PKI" (Jan. 13, 2004), available at http://whatis.techtarget.com/definition/0,2989893,sid9_gci214299,00.html, 4 pages.
Microsoft Software Piracy Protection "Product Activation Facts", at http://www.microsoft.com/piracy/activation_faq.mspx, Copyright 2005, 10 pages.
Sip.edu Cookbook, "SIP.edu and Avaya Converged Community Server", at http://mit.edu/sip/sip.edu/avaya.shtml, (Nov. 2004, Mar. 2005) 19 pages.
Avaya—"Product Support Notices (All Avaya Products): Product Support Notices", at http://support.avaya.com/japple/css/japple?temp.documentID=233413&temp.productID=1 . . . undated, 2 pages; 2005.
Avaya—"Voice over IP Monitoring" at http://www.avaya.com/gcm/master-usa/en-us/products/offers/integrated_mgt_voip_monoto . . . copyright 2005, 2 pages.
Sun Microsystems, Inc. Java Cryptography Architecture API Specification & Reference, Aug. 4, 2002, 56 pages.
MATLAB Installation Guide for PC, Release 11, The MathWorks Inc, 1999.
Microsoft Systems Management Server 2.0 Resource Guide, Microsoft Press, 1999. ISBN 0-7356-0583-1.
Windows NT Server 4. Garms, Jason. SAMS Publishing, 1998. ISBN 0-672-31249-2.
Java Skyline: Java Servlet/Server Headline News, Oct. through Dec. 1998, pp. 1-3.
FLEXIm End Users Guide, Version 9.2. Jul. 2003. Published by Macrovision. 166 pages.
A. Menezes, P. van Oorschot and S. Vanstone, Handbook of Applied Cryptography, cr8523_01[1].pdf, Chapter 1, 48 pages, 1997.
A. Menezes, P. van Oorschot and S. Vanstone, Handbook of Applied Cryptography, cr8523_1 0[1 ].pdf, Chapter 10, 40 pages, 1997.
A. Menezes, P. van Oorschot and S. Vanstone, Handbook of Applied Cryptography, cr8523_12[1].pdf, Chapter 12, 53 pages, 1997.
Bowman, Louise, Smart Cards Go Corporate (Andrew Phillips from Dataquest forecasts the number of smart cards corporations will buy to increase to 91.9 mil by 2004 from a total of 230,000 in 2000), Oct. 2000, Thomson Media, Oct. 2000, pp. 1-6.
Kuchinskas, Susan, Keeping content safe is a big job and everyone has to do it: the security of its corporate content can make or break Topps. (Topps employs security consultant to watch network traffic), Jul. 2003, 2003 Online, Inc., Jul. 2003, pp. 1-5.
Multos Fights On, Jan. 2004, Thomson Media, Inc., Jan. 2004, pp. 1-7.
"RightNow Technologies and MarketFirst Partnership Delivers Complete E-Marketing Solution", PR Newsire, Aug. 14, 2001, p. 1.
Background of the Invention for the above-captioned patent application (previously provided).
White, Ron. How Computers Work, Millennium Edition. Que Publishing, 1999. Front Matter, Back matter, and pp. 4-13,36-37,106-111, and 122-133 included.
Stevens, W. Richard. Advanced Programming in the UNIX Environment. Addison-Wesley, 1993. Front matter, back matter and pp. 18-21 included.

* cited by examiner

PREDICTIVE SOFTWARE LICENSE BALANCING

FIELD OF THE INVENTION

The invention relates to software licensing, and in particular to a system for controlling the number of users that concurrently use a licensed software file.

PROBLEM

It is a problem in the software field to prevent unauthorized users from accessing and using an application file while also providing a method to allow customers to purchase and concurrently use more than one copy. A number of software publishers license software files under a pricing model wherein a customer purchases the right to concurrently use a predetermined number of copies. Software files that are sold for concurrent use are often delivered with license management software installed on a license server, from which the customer requests software licenses. The licensing management software ensures that the customer does not use more licenses than they have purchased and are entitled to use. A problem arises when a customer attempts to share use of the application files at more than one site.

Effective management of multiple copies of application files and "floating licenses" presents a major dilemma for computer site administrators and software application publishers. The focus of control for managing multiple copies of an application file or application file software license is the physical location of the application file or the program disk. The details of controlling physical access and the degree of inconvenience vary, but in a world of hard disks, networks, file servers and electronic email, management based on controlled distribution is intrinsically impractical or even impossible. Without any practical tools, site administrators are forced to rely on a rather ill defined "reasonable effort" at software license compliance. Three solutions have commonly been used.

The first solution has been to run the license management software at only one site and require users at other sites to request a software license across a wide-area-network (WAN) as described in U.S. Pat. No. 5,742,757. There are disadvantages to this approach. Software license requests across a WAN can be slow, and if the WAN connection goes down, some sites may be unable to request software licenses. A solution to the problem is to break the software licenses into subsets and provide each site with its own license server, licensing management software and a set of software licenses. Using this solution, users at each site contact their local license server first. If the license server does not have a license available, the user is required to request a license from another server across the WAN. However, the user has no way of knowing which license server has a software license available. The problem is exasperated when additional sites are added, providing fewer software licenses at each site and additional sites to contact to request a software license.

A third solution, a licensing product named "KeyServer" from Sassafras Software of Hanover N.H., solves the previously discussed problems by providing a system that allows "ghost servers". Customers purchase and use KeyServer to control the number of concurrent application users so that the business does not use more software licenses than the business has purchased and therefore has a right to use. Ghost servers are placed at each site and handle software license requests from clients at those sites. Ghost servers obtain software licenses from a central license server. If a ghost server can not contact the central license server, the ghost server acts as the central license server. While this solution offers a very reliable system, a problem arises with controlling licensing limits. When the central license server is not available to the ghost servers, each ghost server acts as the central license server, enabling each ghost server to allow access to the entire software license count at each and every site. Whether intentional or inadvertent, failure of the central license server provides a method for exceeding license limits.

For these reasons, a need exists for a system to track the number of software licenses used at each license server site, analyze software license usage at each site, and allocate a set of software licenses to each site based on the sites predictive software license usage.

SOLUTION

The predictive software license balancing system authorizes concurrent use of an application file at multiple sites. Initially, the plurality of software licenses are divided among the multiple sites. A license server located at each site accepts software application file usage requests from users at that particular site. If a software license is available when the request is received, the user is granted an authorization to access and use the corresponding application file. The multiple license servers are interconnected via a WAN or other network connection. As concurrent usage of an application are authorized at the multiple sites, the license servers record the application file usage statistics relating to the number of software licenses available and number of concurrent users authorized during a predetermined time period and exchange the usage statistics with the other license servers. Using the usage statistics from the multiple license servers, the percentage of application file concurrent usage at the multiple sites is calculated. Using the usage statistics gathered over a period of time, the application file concurrent usage for each site is predicted and software licenses distributed accordingly.

In the event communication between one license server and the other license servers temporarily fails, the disconnected license server would continue to operate based on the previous predictions. The other license servers would continue to rebalance software license distribution between the communicating license servers using previous predictions for the disconnected license server. When the connection is reestablished, new usage statistics are shared and new predictions calculated and the software licenses are redistributed according to the predictions. Following a complete failure of a license server, connection with the other license servers is established and valid usage statistics retrieved from one of the other license servers.

If connection to the other license servers were not reestablished within a time period, the disconnected license server may consider the failure to be permanent. Following a permanent failure, the license server would revert to a default set of software licenses available for authorizing concurrent application file usage at that particular site. In this embodiment, the other connected license servers may rebalance the software licenses based on the default set of software licenses available for the disconnected license server.

DETAILED DESCRIPTION

The predictive software license balancing system summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

A number of software providers license software files under a pricing model wherein a customer purchases the right to concurrently use a predetermined number of copies of an application file, referred to as "floating licenses". Software files that are sold with "floating licenses" are often delivered with license management software installed on a license server, from which users request software licenses. The licensing management software ensures that the customer does not use more licenses than they have purchased and are entitled to use.

Figure 1:
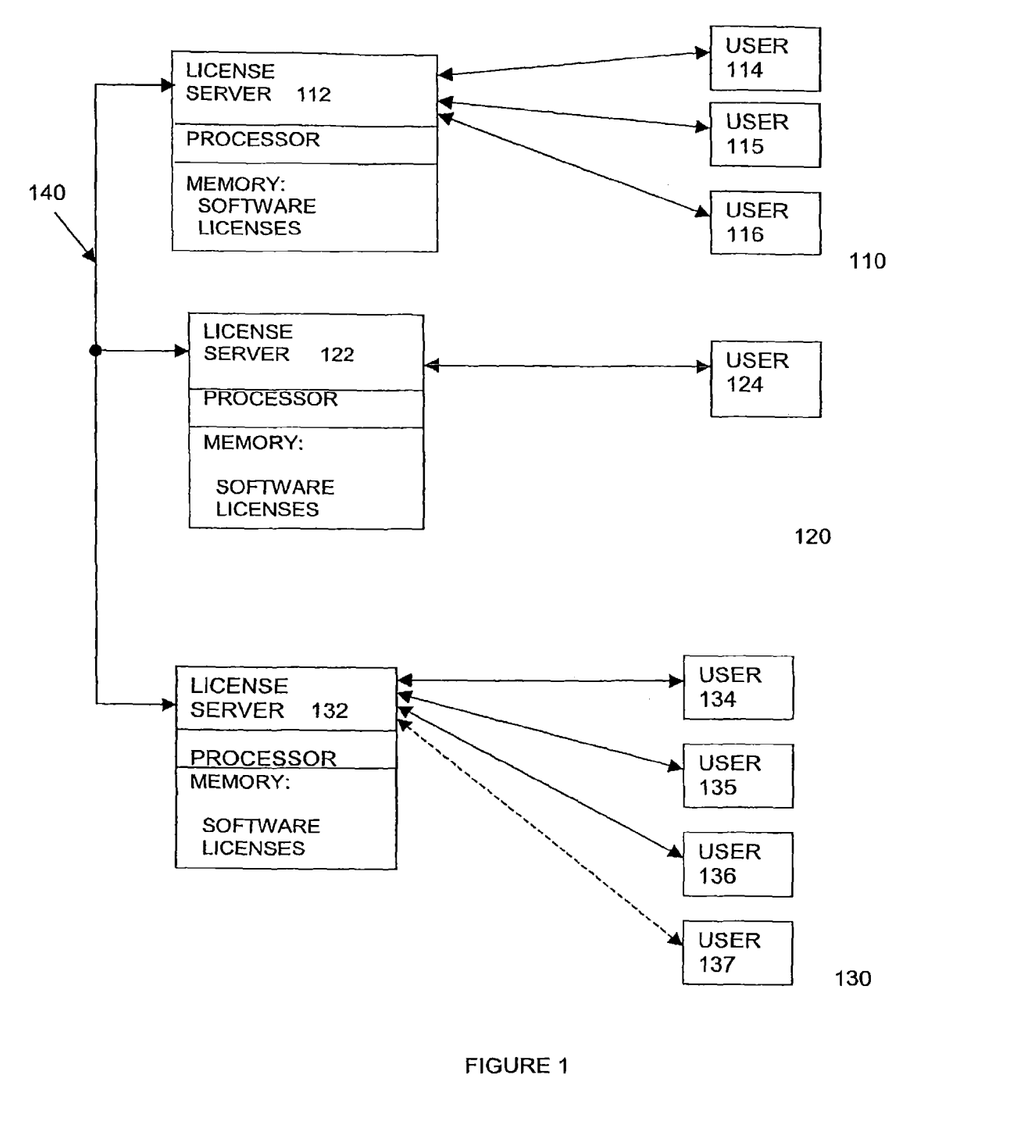
FIG. 1 illustrates a block diagram of a multi-site organization using the present predictive software license balancing system.

Predictive Software License System Configuration—FIG. 1:

The present predictive software license balancing system is configured to operate between two or more sites. Referring to the block diagram in FIG. 1, a set of software licenses is shared amongst three sites 110, 120 and 130. Each site includes a license server, 112, 122, and 132, for controlling application file authorization at the particular site. License servers 112, 122, and 132 are linked together via a communication channel 140 such as a wide area network (WAN) for sharing application file usage statistics.

In the example illustrated in FIG. 1, eight licensed copies of the application file are available for concurrent usage by users at three sites 110, 120 and 130. Initially the software licenses are divided into subsets and distributed among the three sites 110, 120 and 130. Each license server 112, 122 and 132 receives application file usage requests from users at the particular site, if a software license is available, the user is granted an authorization to access and use the corresponding application file.

Figure 2:
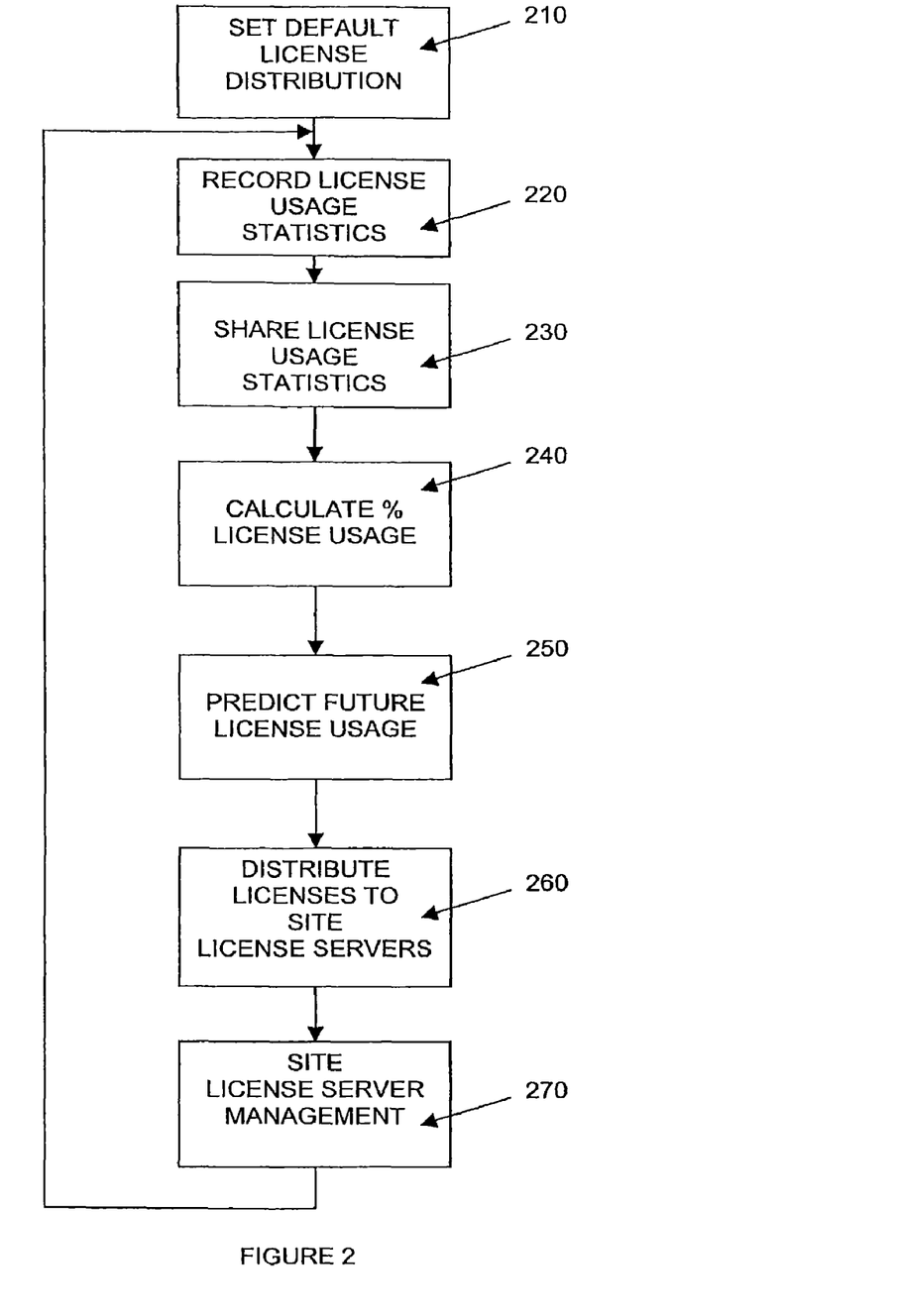
FIG. 2 is a flow diagram of software license balancing using the present predictive software license balancing system.

Software License Balancing—FIGS. 1 and 2:

Referring to the flow diagram in FIG. 2, the license server, such as license server 112, records application file usage statistics in step 220 for site 110 for a period of time. The application file usage statistics complied in step 220 by each license server 112, 122 and 132 are distributed to the other license servers in step 230 where they are stored in memory for use in calculating the percentage of concurrent application file usage of each license server. Using the shared application file usage statistics from step 230, the percentage of concurrent application file users for each site is calculated in step 240 by processing devices within each license server. Each server is performing the same calculations using the same statistics, therefore each license server will calculate the same percentage of concurrent application file users. Each license server records the results for future use and makes available a corresponding number of application files in step 260 which will be authorized as application file usage requests are received. Compilation of application file usage statistics by the processing device at each site over a predetermined period of time provides the statistics required for predicting future application file usage in step 250. Once application file usage predictions are calculated in step 250, the number of application files available for use at each site are recalculated in step 260 according to the predictions, thus balancing the software license distribution.

For example, if sites 110 and 130 authorize three concurrent users to access and use the application file between the hours of 8 am and 5 pm, sites 110 and 130 each use approximately forty-percent of the available software licenses. Site 120 application file usage during the same time period is one in this example. Therefore the eight software licenses are initially distributed in step 210 with a subset of three software licenses distributed to each site 110 and 130 and the remaining two software licenses are distributed to site 120. In step 270, the license server at each site manages authorization of concurrent usage for that particular site.

Providing a method for compiling and sharing application file usage statistics between the multiple license servers reduces the time required to request a software license from a central license server and balances the number of software licenses available at each particular site. By balancing the number of software licenses available at each license server based on predicted application file usage reduces the need to transfer software licenses between license servers, thus saving time. A multi-site organization using the present predictive software licensing balancing system reduces the WAN traffic required by prior art license distribution systems to request and transfer software licenses. Instead, WAN bandwidth is required only for sharing application file usage statistics and the application file usage statistics can be schedule for distribution during optimal times.

Figure 3:
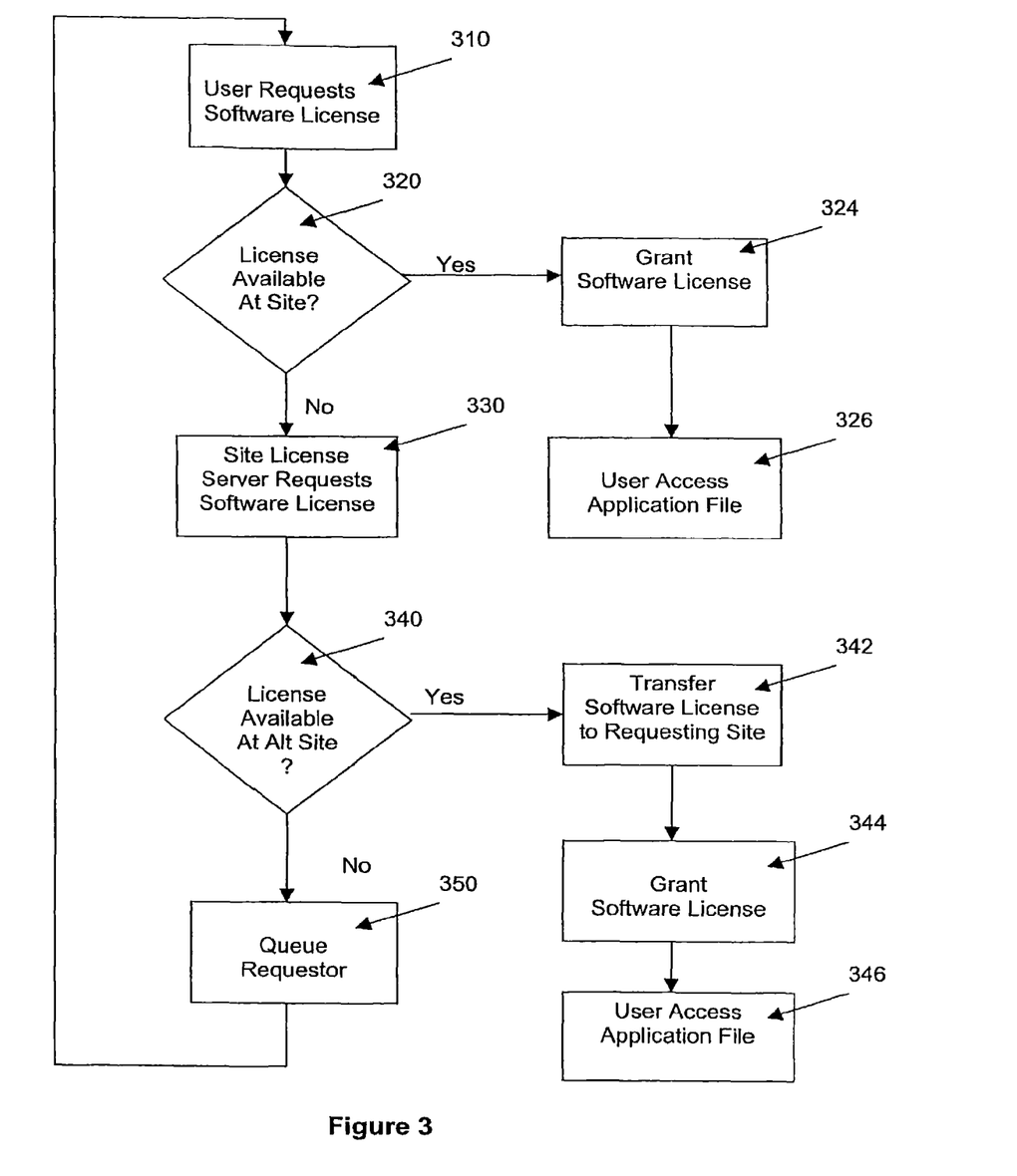
FIG. 3 is an operational flow diagram of the present predictive software license balancing system.

Operational Characteristics—FIGS. 1, 2 and 3:

Referring to the block diagram in FIG. 1 in conjunction with the operational flow diagram in FIG. 3, site 110 received software application file usage requests in step 310 from three users, 114, 115 and 116. As license server 112 receives a license request from a user, the processor within the license server 112 checks the number of software licenses available for site 110 that were recorded in memory. Since three software licenses are available, user 114 is first granted authorization to use the application file. The processor records the number of software licenses granted along with the number of software licenses available. When users 115 and 116 request a software license, the processor checks both the number of software licenses available and the number of software users authorized. If software licenses are available, the license server authorizes the users in step 324 to access and concurrently use the application files in step 326. Likewise, license server 122 authorizes usage in step 324 to user 124 while license server 132 authorized concurrent usage of the application file in step 324 to the first three users requesting software licenses in step 310, users 134, 135 and 136 in this example. License server 122 has one software license available while license servers 112 and 132 have granted all available software licenses.

When license server 132 receives an application file usage request in step 310 from user 137, license server 132 determines in step 320 whether a software license is available. If a software license is not available in step 320, license server 132 sends a software license request to an alternative license server, such as license server 122, in step 330. License server 122 has authorized one user and has one software license available. The request for a software license is granted by license server 122 to requesting license server 132 in step 342. Each license server updates the number of software licenses available at the two sites. License server 122 now has one software license available and one software license granted. If a subsequent user requests usage of the application file, server 122 would have to deny the request unless another license server such as license server 112 or 132 have a software license available. Likewise, license server 132 updates records to show four software licenses available. In step 137, license server 132 authorizes concurrent use to user 137 allowing user 137 to access and use the application file in step 346.

In the event that there is not a software license available at the three sites 110, 120 and 130, the application file usage requester, user 137 in this example, is queued for authorization to concurrently use the application file when a software license is available from any one of the three sites 110, 120 or 130. In this example, license server requested a software license from license servers 112 and 122. The requests were denied since license servers 112 and 122 have granted concurrent use of the software licenses available for their particular site. The request remains active at each license server 112, 122 and 132 until a user terminates use of an application file, at which time the request from license server 132 is granted.

Referring to FIG. 2, the application file usage for each site is compiled by the site license server in step 220 and shared with the other license servers in step 230. Using previously collected software application file usage statistics from each site in conjunction with the new application file usage statistics, future application file usage is predicted in step 250. The software licenses are redistributed accordingly in step 260, thus balancing the number of software licenses available at each site. The multiple site license servers continue to share application file usage statistics, predict future application file usage requirements for each site and to redistribute the software licenses accordingly.

Predictions may also be based on usage statistics by time-of-day or day of the week. For example, license servers on opposite coasts or in different countries may share software licenses and use the software licenses at different times, thus providing more software licenses available at each site without the purchase of additional software licenses. Software applications are licenses for 24-hour use although many businesses only use the application files during an eight or ten hour day. Sharing the software licenses with a site using the application file during opposite hours saves the cost associated with purchasing twice as many software licenses.

Figure 4:
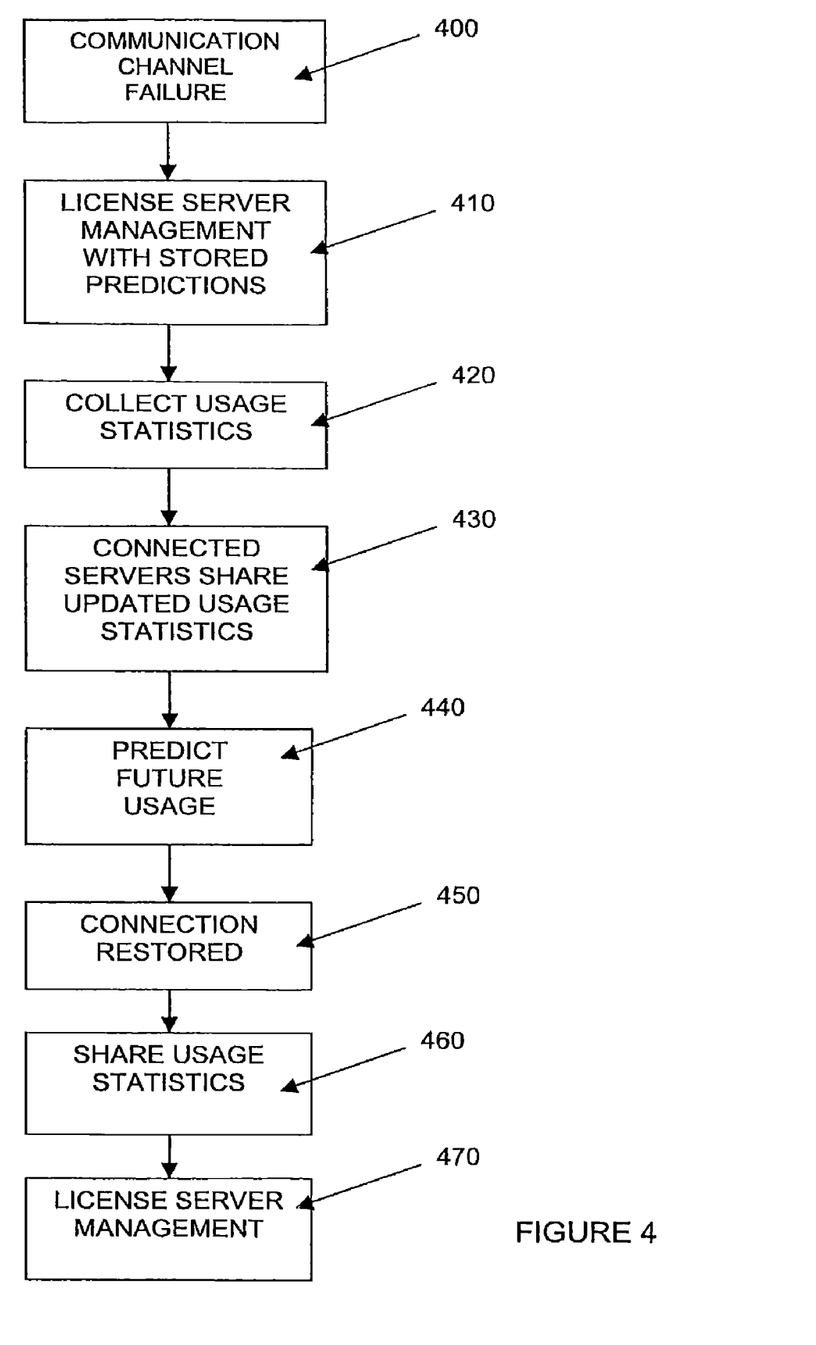
FIG. 4 is an operations flow diagram of the present predictive software license balancing system.
Figure 5:
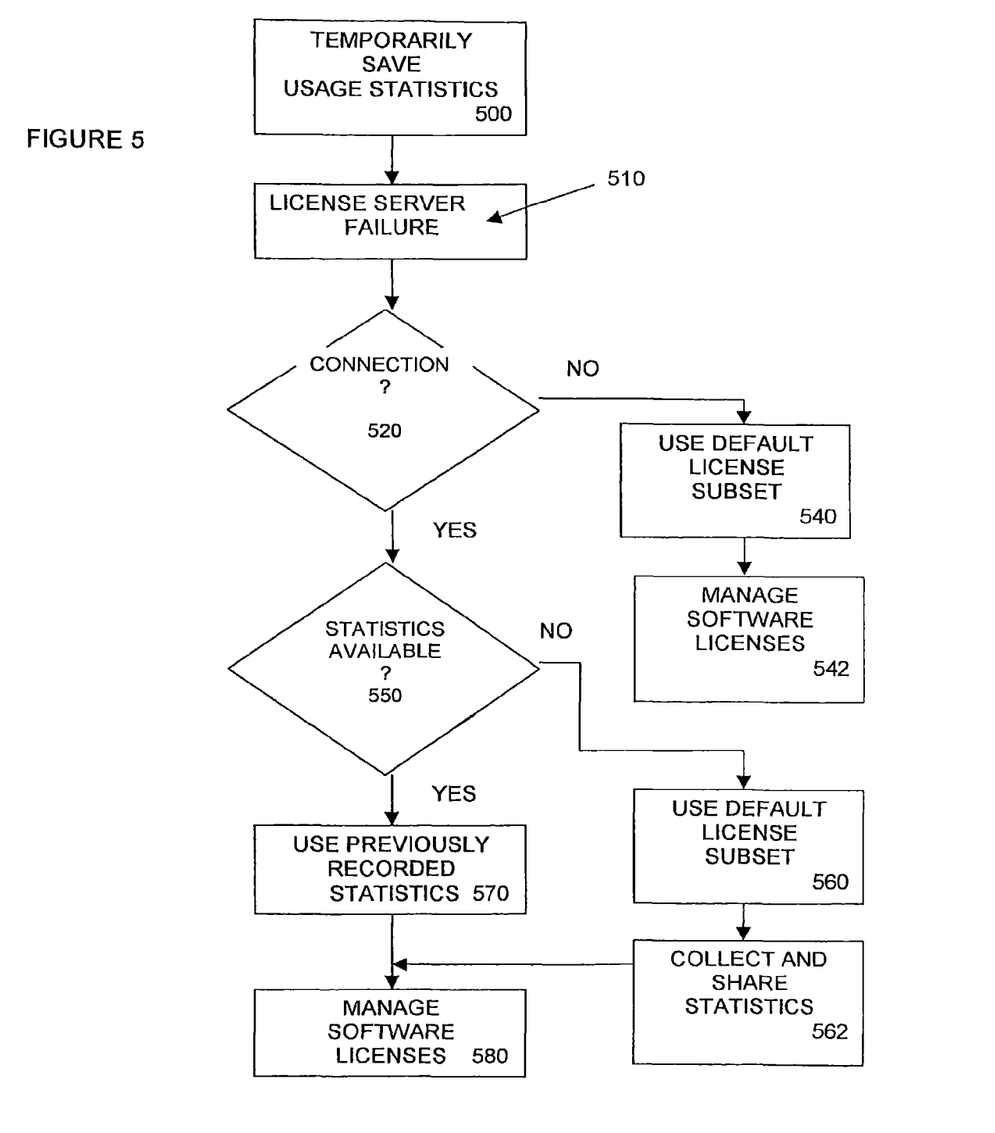
FIG. 5 is another operations flow diagram of the present predictive software license balancing system.

Failure Mode—FIGS. 1 and 4-5:

Failure of the communication channel in step 400 between one license server and the other license servers does not prevent each license server from managing the authorization of concurrent application file usage at that particular site in step 410. Instead, the disconnected license server continues to manage application file usage requests in step 410 based on the stored predictive license balancing. Likewise, the other two license servers manage concurrent usage in step 410 at their particular site based on previously calculated application file usage predictions. However, the connected license servers continue to collect and share application file usage statistics in steps 420 and 430. Using the new application file usage statistics combined with the previously recorded application file usage statistics for the disconnected license server, the connected license servers predict future application file usage statistics in step 440 and redistribute software licenses accordingly, taking into account the number of concurrent users predicted for the disconnected license server. Meanwhile, the disconnected license server continues to collect application file usage statistics. In step 450 when the connection is restored, the application file usage statistics are shared in step 460 with the other license servers and new application file usage predictions calculated and each license server continues to manage software licenses at their particular site in step 470

Referring to the operational flow diagram of FIG. 5, application file usage statistics and predictions are temporarily saved in memory in step 500. They are not permanently saved on the license server to eliminate the susceptibility of tampering with the statistics or predictions. Therefore, complete failure of a license server in step 510 results in stored application file usage statistics and predictions being lost. When the failed license server reinitializes, connection with the other license servers is established in step 520. If usage statistics are available in step 550, the previously failed license server retrieves the usage statistics and previously calculated predictions in step 540 and operation between the multi-site license servers proceeds as usual in step 580. However, if the previously failed license server is unable to reestablish connection with the other license servers in step 520, all is not lost. Instead, the previously failed license server reverts back to the default software license subset in step 540. Thus, regardless of the status of reconnection with the other license servers, the previously failed license server manages the default subset of software licenses in step 542 until connection is reestablished. Unlike prior art software license management systems, providing a method for license servers that are not able to communicate with other license servers to continue to manage a default subset of software licenses prevents more than one site from granting the concurrent usage of the total number of software licenses. It also provides a method for each site to continue managing application file usage requests at each corresponding site.

If application file usage statistics are not available in step 550 from another license server after the communication channel is restored in step 520, the previously failed license server manages the default software license subset in step 560 and collects and shares updated application file usage statistics in step 562.

A catastrophic failure of all of the license servers simultaneously would result in each license server initializing with the default subset of software licenses. Each license server would collect and share new application file usage statistics as previously discussed. In an alternative embodiment, the usage statistics are periodically sent to an alternative remote storage device. In this embodiment, if all of the license servers fail simultaneously, the first license server reinitialized recovers the previously saved usage statistics from the remote storage device. As the other license servers reinitialize, the other license servers recover usage statistics from the first license server and operation presumes.

As to alternative embodiments, those skilled in the art will appreciate that the present predictive software license balancing system can be configured with an alternative number of sites, license servers and available software licenses. It is also anticipated that the multi-site license servers receive and process software application file usage requests for more than one application file type and that the usage statistics and predictions for each application file type are calculated and distributed independent of the other application file types. Likewise, a single file may contain an application that supports a number of different features that may be individually turned on or off with licenses. Therefore the term application file has been illustrated and described as an example of usage of the present predictive software license balancing system and not as a limitation of usage.

While the present predictive software license balancing system has been illustrated and discussed for use in a multi site situation, usage is not intended to be limited to businesses having multiple sites. The present predictive software license balancing system may be utilized with license servers connected within a Local Area Network (LAN) or a software licensing system having multiple software servers at one or more sites wherein each of the multiple license servers is treated as being a separate site.

It is apparent that there has been described, a predictive software license balancing system that fully satisfies the objects, aims, and advantages set forth above. While the predictive software license balancing system has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A software license distribution system comprising:
   a plurality of software licenses associated with a plurality of application files, wherein each software license authorizes usage of one of the application files, wherein the plurality of software licenses are shared among users at two or more sites;
   a communication channel interconnecting the two or more sites;
   at least two sites, each site comprising:
      a license server, wherein each site has a predetermined number of the software licenses for using a set of application files by a set of users located at the site, the license server comprising:
         a memory;
         a processor in communication with the memory, the processor operable to:
            autonomously generate a software license usage statistic indicative of a number of users concurrently using the application files during a predetermined time period at the site;
            send, through the communication channel, the software license usage statistic to at at least one other license server at least one other site;
            receive, through the communication channel, at least one other software license usage statistic from the at least one other license server at at the at least one other site;
            autonomously calculate a predicted software license usage at the site based on the generated software license usage statistic;
            autonomously calculate at least one other predicted software license usage at the at least one other site based on the at least one other received software license usage statistic from the at least one other site;
            autonomously authorize usage of the first set of application files at the site, wherein the first set of application files corresponds in number to the predicted software license usage at the site; and
            in response to receiving a software usage request in excess of the first predicted software license usage, obtain at least one additional software license from the at least one other site.

2. The software license distribution system of claim 1 further comprising:
   a second memory operable to store the software license usage statistic and the predicted software license usage for the at least two license servers; and
   an interconnecting interface operable to interconnect each of the license servers to the second memory for exchanging the software license usage statistics and the predicted software license usage between the license servers.

3. The software license distribution system of claim 2 wherein one of the license servers is operable to:
   respond to reinitialization of at least one other license server by retrieving the software license usage statistics and the predicted software license usage from the second memory; and
   transmit the retrieved software license usage statistics and the predicted software license usage to a reinitialized license server.

4. The software license distribution system of claim 1 wherein the license server is further operable to:
   monitor for a failure of the communication channel;
   in response to the failure of the communication channel, save the predicted software license usage in the memory; and
   authorize the usage of the set of application files based on the saved predicted software license usage.

5. The software license distribution system of claim 4 wherein the license server is further operable to, in response to reestablishment of the communication channel, receive at a new software file usage statistic from the at least one other license server.

6. The software license distribution system of claim 1 wherein the license server further comprises:
   a subset of the plurality of software licenses; and
   wherein the license server is responsive to initialization for managing the subset of the plurality of software licenses.

7. The software license distribution system of claim 6, wherein license server is further operable to save the subset of plurality of software licenses in the memory for use when the license server is initialized.

8. The software license distribution system of claim 6 wherein the license server is further operable to:
   periodically generate an updated predicted software license usage; and
   in response to generating the updated predicted software license usage, grant one or more application file usage requests up to the number of software licenses corresponding to the updated predicted software license usage.

9. A distributed system for managing a plurality of software licenses used at more than one site, the system comprising:
   a plurality of application files;
   a plurality of software licenses, wherein each application file corresponds to a software license;
   two or more license servers interconnected by a communication channel, each license server including a processor, wherein each license server is located at one of at least two or more sites, each license server operable to:
      autonomously distribute a subset of the plurality of software licenses to a user at the site;
      autonomously receive a usage request from the user located at the site;
      autonomously process the usage request,
      autonomously calculate an application file usage statistic, autonomously generate, from the application file usage statistic, a predicted use data indicative of future application file usage for each of the two or more license servers; and autonomously redistribute the plurality of software licenses among the two or more license servers based on the predicted use data for each of the two or more license servers.

10. The distributed system of claim 9, wherein each license server further comprises:

a memory operable to save the software usage statistic and the predicted use data; and wherein each license server is further operable to:

in response to a failure of the communication channel, save the predicted use data in the memory; and authorize usage based on the saved predicted use data.

11. The distributed system of claim 10 wherein two or more license servers are operable to, in response to reestablishment of the failed communication channel, exchange new application file usage statistics.

12. The distributed system of claim 9 wherein the two or more license servers are further operable to:

update the predicted use data for each of the two or more license servers; and autonomously redistribute the plurality of software licenses between the two or more license servers based on the updated predicted use data; and respond to new usage requests based on the updated predicted use data for the two or more license servers.

13. A method for software license distribution, the method comprising:

distributing, by a license server at a first site, a default subset of software licenses associated with a default subset of a plurality of application files, wherein the plurality of application files are shared among two or more sites and the default subset is shared among one or more users at the first site, wherein the license server comprises a processor and memory, wherein distributing the default subset of software licenses comprises:

receiving, by the license server, a usage request for one software license included in the default subset of the software licenses;

authorizing, by the license server, a usage of a software license if a number of usage requests already authorized is less than a number of software licenses in the default subset of software licenses;

recording, by the license server, a number of usage requests authorized;

autonomously balancing, by the license server, a number of software licenses between the first site and one or more other sites, wherein balancing comprises:

autonomously calculating, by the license server, a first application file usage statistic;

sending, by the license server, the first application file usage statistic to at least one other license server;

receiving, by the license server, a second application file usage statistic from at least one other license server;

autonomously predicting a first future application file usage, for the first site, based on the first application file usage statistic;

autonomously predicting, by the license server, a second future application file usage, for at least one other site, based on the second application file usage statistic; and redistributing, by the license server, the plurality of application files between the at least two license servers based on the first future application file usage and the second future application file usage.

14. The method of claim 13 wherein distributing the default subset of software licenses further comprises:

if a number of usage requests already authorized is more than a number of software licenses in the default subset of software licenses, requesting a software license from at least one other site; and receiving a transfer of the software license from the at least one other site to the first site, authorizing the usage request based on receiving the transfer of the software license, and adjusting a number of software licenses available at the first site by summing the number of software licenses in the default subset of software licenses with a number of transferred software licenses.

15. The method of claim 13 further comprising:

if a number of usage requests already authorized is more than a number of software licenses in the default subset of software licenses, queuing one or more usage requests; and in response to a transfer of a software license, authorizing a queued usage request.

16. The method of claim 13 further comprising:

determining a failure of a communication channel between the first site and at least one other site;

in response to the failure, authorizing usage requests only for the default subset of software licenses.

17. The method of claim 13 wherein the license server and at least one other license server at at least one other site is connected to a storage device, wherein the method further comprises:

storing the second application file usage statistic and the second future software license usage on the storage device;

in response to reinitialization of at least one other license server at least one other site, retrieving the second application file usage statistic and the second future application file usage from the storage device; and distributing the plurality of application files based on the retrieved second future software license usage.

* * * * *

UNITED STATES PATENT AND TRADEMARK OFFICE
CERTIFICATE OF CORRECTION

| | | |
|---|---|---|
| PATENT NO. | : 8,041,642 B2 | Page 1 of 1 |
| APPLICATION NO. | : 10/192388 | |
| DATED | : October 18, 2011 | |
| INVENTOR(S) | : Rohan Lenard, Julian J. Orbach and Martin Smyrk | |

It is certified that error appears in the above-identified patent and that said Letters Patent is hereby corrected as shown below:

Column 7, line 46, after "usage statistic to" delete the first "at" therein.

Column 7, line 47, after "license server at" add the word --at-- therein.

Signed and Sealed this

Nineteenth Day of June, 2012

David J. Kappos
*Director of the United States Patent and Trademark Office*